US005871662A

United States Patent [19]

Van Der Zaag et al.

[11] Patent Number: 5,871,662

[45] Date of Patent: Feb. 16, 1999

[54] SINTERED TRANSFORMER OR INDUCTOR CORE OF NIZN FERRITE MATERIAL

[75] Inventors: Pieter J. Van Der Zaag; Arjan Noordermeer, both of Eindhoven; Pieter J. Van Der Valk, Geldrop, all of Netherlands

[73] Assignee: U.S. Philips Corporation, New York, N.Y.

[21] Appl. No.: 978,963

[22] Filed: Nov. 26, 1997

Related U.S. Application Data

[63] Continuation of Ser. No. 645,437, May 13, 1996, abandoned, which is a continuation-in-part of Ser. No. 539,631, Oct. 5, 1995, abandoned, which is a continuation of Ser. No. 241,494, May 10, 1994, abandoned.

[30] Foreign Application Priority Data

Nov. 5, 1993 [BE] Belgium .............................. 09300483

[51] Int. Cl.[6] ............................. C04B 35/30; H01F 1/34; H01F 27/255

[52] U.S. Cl. .......................... 252/62.62; 336/233; 336/30

[58] Field of Search .................. 336/233, 30; 252/62.62

[56] References Cited

U.S. PATENT DOCUMENTS

| | | | |
|---|---|---|---|
| 4,059,664 | 11/1977 | Nicolas et al. | 252/62.62 |
| 4,372,865 | 2/1983 | Yu et al. | 252/62.62 |
| 5,626,789 | 5/1997 | Varshney et al. | 252/62.62 |

*Primary Examiner*—Melissa Bonner
*Attorney, Agent, or Firm*—Norman N. Spain

[57] ABSTRACT

The invention describes a transformer core of NiZn ferrite material. Said transformer core exhibits low overall losses when it is used in a transformer. Said low losses are attained if the majority of the grains of the sintered ferrite material have a monodomain structure. This is the case if the average grain size is smaller than 2.8 microns. The average grain size of the sintered material preferably ranges of from 1.3 to 2.6 microns. The δ-value is preferably less than 4 nm.

14 Claims, 2 Drawing Sheets

SINTERED TRANSFORMER OR INDUCTOR CORE OF NIZN FERRITE MATERIAL

RELATED APPLICATIONS

This application is a continuation of application Ser. No. 08/645,437 filed May 13, 1996, now abandoned, which application Ser. No. 08/645,437 is a continuation-in-part of application Ser. No. 08/539,631 filed Oct. 5, 1995, now abandoned and which application Ser. No. 08/539,631 is a continuation of application Ser. No. 08/241,494 filed May 10, 1994, now abandoned.

BACKGROUND OF THE INVENTION

The invention relates to a sintered transformer or inductor core of NiZn ferrite material. The invention also relates to an inductor and a transformer which are provided with such an inductor respectively transformer core. By means of a transformer the voltage and/or the current intensity of a current source can be converted to another desired voltage and/or current intensity.

A transformer core of the type mentioned in the opening paragraph is known per se. For example, in Philips Data Handbook MA-01, 1993, pp. 131 and 132, a NiZn core is disclosed which is referred to as 4F1. The material composition of the core described in said handbook corresponds to the formula $Ni_{0.49}Zn_{0.49}Co_{0.02}Fe_{1.90}O_{3.85}$. This transformer core is intended for use, in particular, in a so-called "power-transformer". This type of transformer can suitably be operated at frequencies in the MHz range and at relatively high induction values of 5 mT or higher.

The drawback of the known transformer or inductor core is that it exhibits relatively high overall losses per volume unit (P) if it is used in a "power-transformer". Said losses cause the transformer to heat up. In particular, if the transformer is used at frequencies of from 2 MHz it heats up to relatively high temperatures. For example, as shown in FIG. 7 on page 132, at 20° C. an overall loss per volume unit of 190 mW/cm$^3$ is measured on these cores at an induction of 10 mT and a frequency of 3 MHz.

SUMMARY OF THE INVENTION

It is an object of the invention to provide a transformer or inductor core which exhibits relatively low overall losses, in particular, when it is used in a power transformer. The invention further aims at providing an inductor as well as a power transformer which are provided with such an inductor respectively transformer core.

These and other objects are achieved in accordance with the invention by a transformer or inductor core of the type mentioned in the opening paragraph, which is characterized in that the majority of the grains of ferrite material have a monodomain structure.

It has been found that sintered cores of NiZn ferrite material having predominantly monodomain grains, and in which the atomic percentage of Ni is at least as high as the atomic percentage of Zn exhibit surprisingly low overall losses. As will be described in greater detail in the exemplary embodiments, the measure in accordance with the invention enables overall losses to be reduced by 50% or more. An exact explanation for this substantial decrease of the losses is not available as yet. The Applicant of the present invention, however, has experimentally established that said low losses are independent of the magnetic permeability ($\mu$) and, in the case of small grain sizes, of the exact grain size. It has been found that an essential prerequisite of attaining the effect of the invention is that the majority of the grains of the sintered material has a monodomain structure. The expression "the majority of the grains" is to be understood to mean herein that at least 90% of the grains of the ferrite material has a monodomain structure.

A preferred embodiment of the invention is characterized in that the average grain size of the material is less than 2.8 microns. The Applicant of the present invention has established in a series of experiments that the quantity of monodomain grains is approximately 90% if the average grain size is approximately 2.8 microns. At a smaller average grain size, the quantity of monodomain particles increases proportionally. A level of approximately 100% of monodomain grains is attained at an average grain size below approximately 2.6 microns. However, a loss mechanism which is not yet understood causes the overall losses to increase if the average size of the monodomain grains is selected to be smaller than 1.1 microns. In the preferred average grain size range of from 1.3 to 2.6 microns, the overall losses are substantially constant and substantially independent of the grain size. The grain size of the sintered NiZn cores was determined by means of the so-called "linear mean-intercept" method.

It is noted that the majority of the grains of the known 4F1 material did not have a monodomain structure. The average grain size was approximately 3.1 microns.

A further favourable embodiment of the sintered core in accordance with the invention is characterized in that the ferrite material of the core comprises 42.8–55.9 mol % $Fe_2O_3$, 17.6–45.7 mol % NiO and 8.4–34.3 mol % ZnO. Cores whose composition falls within said limits exhibit a relatively high spontaneous induction ($B_s$). This has a favourable effect on said cores, since the losses are relatively low as compared to cores having a relatively low saturation magnetization.

It is noted that the ferrite material preferably comprises a relatively small quantity of Co up to about 2 at.% of the total amount of the Ni and Zn present. The presence of this additive leads to a relatively plane $\mu$-T curve, in particular in the temperature range in which power transformers are operated. However, a quantity of Co in excess of 1.5 at.% is disadvantageous. It does not result in a higher degree of planeness of said curve. Moreover, Co is expensive and toxic. The ferrite material in accordance with the invention may further comprise small quantities of dopants, such as in particular sintering agents, for example $V_2O_5$ and $Bi_2O_3$. In addition, MnO, $SiO_2$ and CaO may be present. The maximum quantity of each of said dopants, however, is less than 2 wt. %.

Another preferred embodiment of the core in accordance with the invention is characterized in that the ferrite material of the core comprises 42.8–50.0 mol % $Fe_2O_3$, 20.0–45.7 mol % NiO and 10.0–34.3 mol % ZnO. Unlike the above-mentioned composition range, the NiZn ferrites described in this preferred embodiment all have an Fe deficiency. An Fe deficiency is favourable because, by virtue thereof, the presence of $Fe^{2+}$ ions in the ferrite material is precluded. The presence of $Fe^{2+}$ ions leads to increased eddy-current losses.

A further interesting embodiment of the inventive core is characterized in that the ratio of the average grain size d to the initial permeability $\mu_i$ at the Curie temperature is $d/\mu_i<4$ nm. This ratio is denoted by $\delta$ (delta).

The last-mentioned embodiment is based on the observation that, at relatively high induction values (B>15 mT), hysteresis losses in the sintered ferrite material comprising monodomain grains contribute substantially to the overall losses if the value of δ is selected to be relatively high. This contribution can be reduced considerably by making said δ-value smaller than 4 nm. In this case, a smaller part of the applied field is present across the grain boundary during operation of the sintered core. As a result, a larger part of the applied field is available for varying the magnetisation of the ferrite material in accordance with the desired wave shape. It has been found that the value of δ depends to a smaller or greater degree on the deviation from the stoichiometry of the ferrite material. At greater deviations from the stoichiometry, a larger quantity of divalent metal oxides (for example NiO and/or ZnO) will be deposited on the grain boundaries. This causes an increase of the value of δ. In sintered ferrite materials which are substantially stoichiometric the value of δ is below 4 nm.

The invention also relates to an inductor. The essential component of such an inductor is a single sintered inductor core which comprises a winding. In accordance with the invention, an inductor core as described above is used in the inductor.

The invention also relates to a transformer comprising a transformer core having a primary and a secondary winding as well as a high-frequency switch for converting a DC voltage on the primary winding to a square-wave voltage. This transformer comprises a transformer core in accordance with the present invention and is used in a so-called "switched-mode power supply". This type of transformer is generally operated at high frequencies and high inductions. Consequently, the transformer cores in accordance with the invention can be very advantageously used in said transformers.

For the manufacture of transformer cores in accordance with the invention, use was made of a powder of NiZn ferrite of the invention. This powder was manufactured by means of standard ceramic techniques. In the manufacture, oxides and/or carbonates of the metals were mixed in a proportion which corresponds to the intended composition, presintered and wet-ground. The mixture thus obtained was either dried and granulated or dry-sprayed and subsequently compacted into the intended shape and sintered in air. In this manner, a number of the above-described transformer cores having different average grain sizes were manufactured by varying the sintering temperature (1000° C.–1300° C.) and the sinter duration. The core material, which has an average grain size of 0.3 microns, was manufactured by means of hot-isostatic pressing.

DESCRIPTION OF THE PREFERRED EMBODIMENTS

Figure 1:
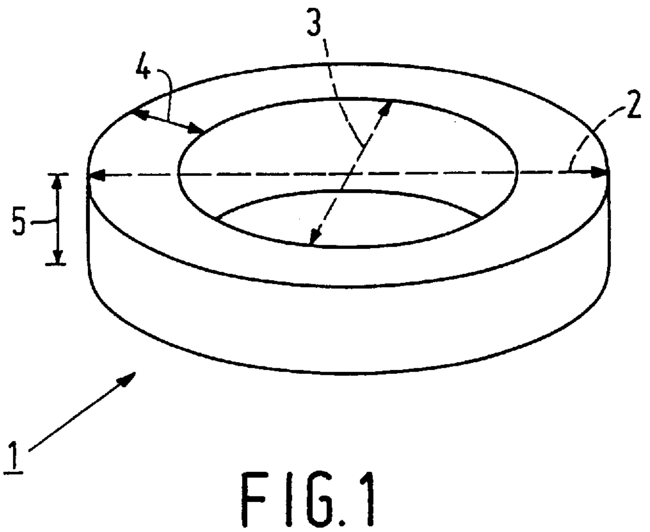
FIG. 1 is a perspective view of a transformer core in accordance with the invention, FIG. 2 graphically shows the losses per volume unit P ($mW/cm^3$) as a function of the grain size d (microns) of a number of transformer cores.

Embodiments of the invention will be explained in greater detail by means of examples and with reference to the accompanying drawings:

FIG. 1 shows an annular transformer core 1 having an outside diameter 2 of 5 mm and an inside diameter 3 of 3 mm. The width 4 and the height 5 are 1 mm. The core may alternatively have another, for example oval, shape. The cross-section of the ring may alternatively be rectangular or round instead of the square cross-section shown in the Figure. The sintered transformer cores in accordance with the present invention may alternatively rod-shaped (inductor), E-shaped or U-shaped. It is also possible to have tube-shaped cores, f.i. for use in h.f. induction bulbs. The transformer core consists of sintered NiZn ferrite. The composition of the sintered material is given by the formula $Ni_{0.49}Zn_{0.49}Co_{0.02}Fe_{1.90}O_{3.85}$. The material consists of sintered grains having a monodomain structure and an average grain size of 2.2 microns.

NiO, ZnO, $Fe_2O_3$ and $Co_3O_4$ were mixed in a proportion which corresponds to the composition of the material of the formula recited on line 20 of this page. The thus obtained mixture was presintered at a temperature between 800° and 950° C., milled in a ball-mill and subsequently dried at 120° C. The resulting powder was granulated and compacted into the intended ring-shaped transformer core. The resulting pressed density after compaction was in the range of 2.7–2.9 $g/cm^3$.

Nine batches of fifty cores were selected. Each batch of fifty cores was sintered for 1.5 hours at a temperature between 1000° and 1300° C. The following exact temperatures were used for each batch: 1300° C. (Example a), 1280° C. (Example b), 1260° C. (Example c), 1240° C. (Example d), 1220° C. (Example 1), 1200° C. (Example 2), 1180° C. (Example 3), 1100° C. (Example 4) and 1060° C. (Example 5). The example references relate to Table 1. After cooling, the grain size of the cores of these nine batches were determined by means of the mentioned 'linear mean-intercept method'.

TABLE 1

| Example | d | P1 | P2 | P3 |
|---|---|---|---|---|
| a | 6.8 | 797 | 1000 | 1350 |
| b | 3.8 | 759 | 978 | 1385 |
| c | 3.3 | 633 | 800 | 1244 |
| d | 3.1 | 190 | 240 | 150 |
| 1 | 2.6 | 82 | 78 | 91 |
| 2 | 2.4 | 66 | 64 | 59 |
| 3 | 2.2 | 67 | 66 | 59 |
| 4 | 1.7 | 58 | 56 | 51 |
| 5 | 1.1 | 75 | 74 | 66 |

Table 1 lists the overall losses per volume unit P ($mW/cm^3$) of a number of transformer cores in accordance with the invention (examples 1 up to and including 5), in comparison with a number of transformer cores which are not in accordance with the invention (comparative examples a up to and including d). The material having an average grain size of 3.1 microns (comparative example d) is the known 4F1 material. The overall losses per volume unit P of the cores were determined under three different conditions: P1 (3 MHz and 10 mT), P2 (5 MHz and 7.5 mT) and P3 (10 MHz and 5 mT). This Table clearly shows that the quality of the cores in accordance with the invention is superior to the quality of the known cores.

The average value δ of the transformer cores listed in Table 1 was approximately 10 nm. A substantial further reduction of the losses of the cores having monodomain grains could be achieved by using cores having a δ-value of approximately 1–2 nm.

Figure 2:
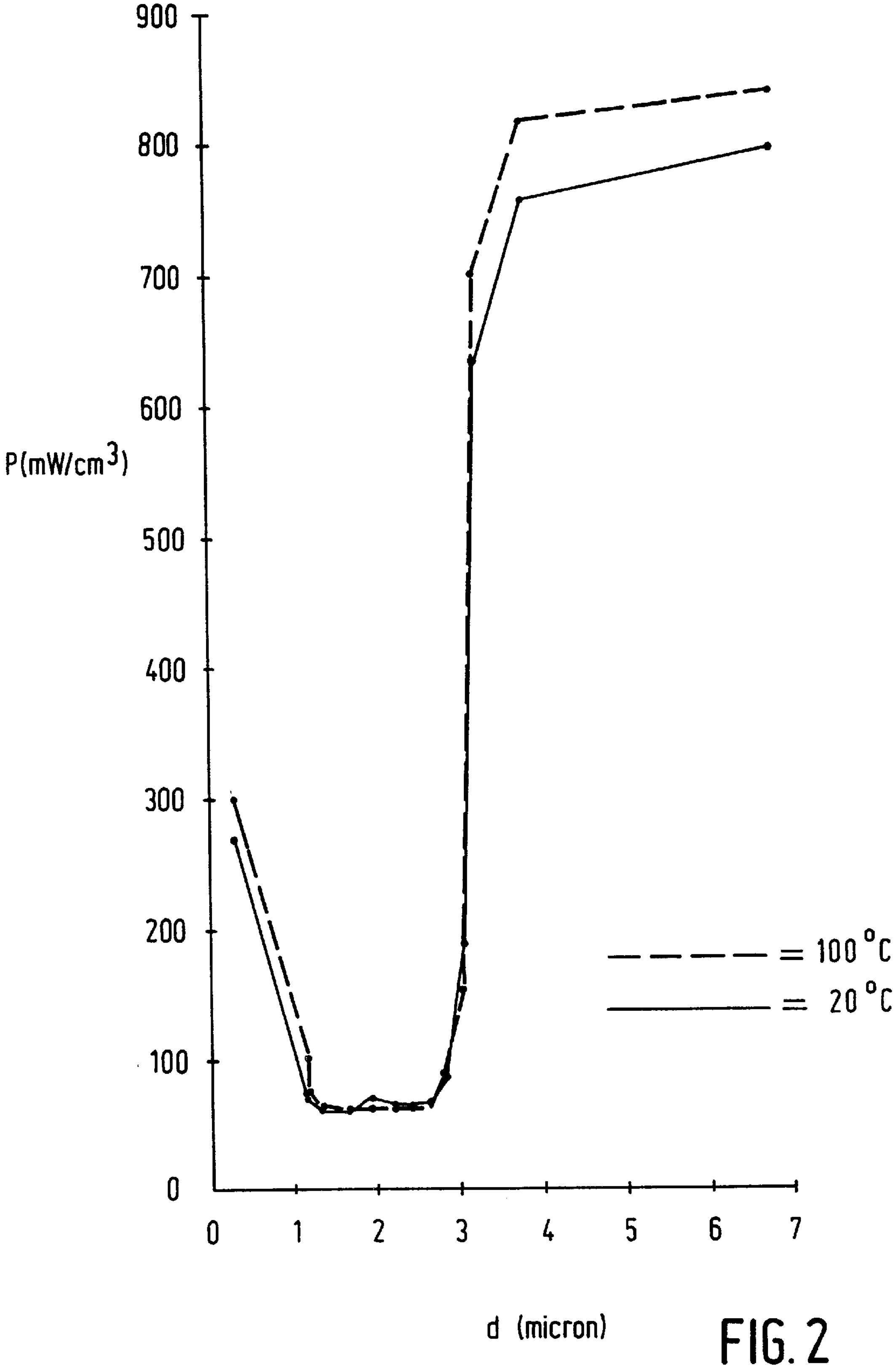

FIG. 2 shows a graph in which the overall losses per volume unit P of the transformer cores of the above composition are shown as a function of the average grain size ("linear mean-intercept" values). The measurement was carried out at 20° C. and at 100° C. at a frequency of 3 MHz and an induction of 10 mT. The Figure clearly shows that at grain sizes ranging between 1.1 and 2.8 microns, the overall losses are below 100 mW/cm$^3$. The smallest overall losses are found, however, at an average grain size ranging between 1.3 and 2.6 microns. These losses are only approximately 80 mW/cm$^3$. By means of neutron-depolarization measurements on these cores it was established that substantially 100% of the grains of the transformer cores having an average grain size below 2.6 microns have a monodomain structure.

Figure 3:
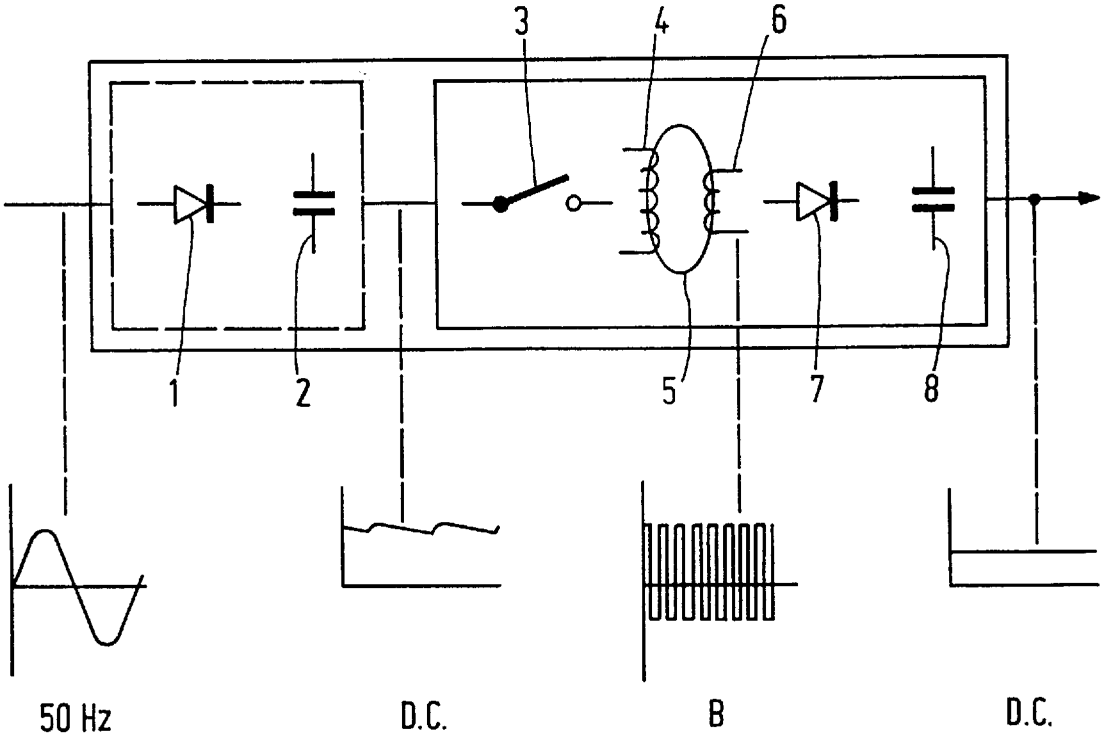
FIG. 3 diagrammatically shows a switched-mode power supply (SMPS) in accordance with the invention.

FIG. 3 diagrammatically shows a transformer of the "switched mode power supply"-type in which the transformer core in accordance with the invention can be very advantageously used. The input mains voltage (50 Hz) is first rectified with a rectifier (1) and then smoothed with a capacitor (2). The DC voltage thus formed is converted to a square-wave B by means of a switch (3) (switching transistor) at very high frequencies (2–20 MHz). This square-wave is applied to the primary winding (4) of the transformer core (5). The transformed square-wave signal which is formed on the secondary winding (6) of the transformer core is subsequently rectified by rectifier (7) and smoothed by capacitor (8). In this manner, a DC voltage of the desired value is obtained. Of course, the cores in accordance with the invention can also be used in other types of transformers. However, the effect of the invention is obtained, in particular, when these cores are used in transformers which are operated at high frequencies (above 2 MHz) in combination with high inductions (above 5 mT).

We claim:

1. A transformer comprising a transformer core having a primary and a secondary winding, characterized in that the transformer core is a relatively low loss exhibiting transformer core of a NiZn ferrite material comprising a ferrite compound containing, apart from O, only Fe, Ni and Zn and Co in a quantity of 0- about 2 at % of the total amount of Ni and Zn present and one or more dopants selected from the group consisting of $V_2O_5$, $Bi_2O_3$, MnO, $SiO_2$ and CaO, each of said dopants being present in an amount by weight of 0-<2%, the average size of the grains of the ferrite material is not greater than 2.8 microns, so that the majority of the grains are monodomain.

2. A transformer according to claim 1, characterized in that the average grain size of the ferrite material ranges between 1.3 and 2.1 microns.

3. A transformer according to claim 1, characterized in that the amount of $Fe_2O_3$, NiO and ZnO in the ferrite compound is 42.8–50.0 mol % $Fe_2O_3$, 20.0–45.7 mol % NiO and 10.0–34.3 mol % of ZnO.

4. A transformer according to claim 1, characterized in that the amount of $Fe_2O_3$, NiO and ZnO in the ferrite compound is 42.8–55.9 mol % $Fe_2O_3$, 17.1–45.7 mol % of NiO and 8.4–34.3 mol % ZnO.

5. A transformer according to claim 1, characterized in that the transformer comprises also a high frequency switch for converting a DC voltage on the primary winding to a square-wave voltage.

6. A transformer according to claim 3, wherein Co is present in the ferrite compound in a quantity not in excess of about 2 at % of the total amount of Ni and Zn present.

7. A transformer according to claim 2, characterized in that the ferrite material comprises at least one of said dopants.

8. A transformer according to claim 3, characterized in that the transformer comprises also a high frequency switch for converting a DC voltage on the primary winding to a square-wave voltage.

9. A transformer according to claim 2, characterized in that the amount of ZnO, NiO and $Fe_2O_3$ in the ferrite compound is 42.8–50.0 mol % $Fe_2O_3$, 20.0–45.7 mol % NiO and 10.0–34.3 mol % of ZnO.

10. A transformer according to claim 2, characterized in that the transformer comprises also a high frequency switch for converting a DC voltage on the primary winding to a square-wave voltage.

11. A transformer according to claim 4, wherein Co is present in the ferrite compound in a quantity (no) not in excess of about 2 at % of the total amount of Ni and Zn present.

12. A transformer according to claim 4, characterized in that the ferrite material comprises at least one of said dopants.

13. A transformer according to claim 6, characterized in that the ferrite material comprises at least one of said dopants.

14. A transformer according to claim 6, characterized in that the transformer comprises also a high frequency switch for converting a DC voltage on the primary winding to a square-wave voltage.

* * * * *